United States Patent [19]

Ernst

[11] Patent Number: 4,461,083
[45] Date of Patent: Jul. 24, 1984

[54] LENGTH OR ANGLE MEASURING INSTRUMENT

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 521,117

[22] Filed: Aug. 8, 1983

[30] Foreign Application Priority Data

Aug. 11, 1982 [DE] Fed. Rep. of Germany ....... 3229846

[51] Int. Cl.³ ...................... G01D 5/245; G01B 11/02
[52] U.S. Cl. .............................. 33/125 C; 33/125 A; 356/374; 250/237 G
[58] Field of Search ............. 33/125 C, 125 R, 125 T, 33/125 A; 356/139, 142, 143, 148, 247, 248, 252, 373, 374, 375, 383; 250/237 G

[56] References Cited

U.S. PATENT DOCUMENTS

| | | | |
|---|---|---|---|
| 3,709,611 | 1/1973 | Taisne | 33/125 C |
| 4,060,903 | 12/1977 | Ernst | 33/125 C |
| 4,127,772 | 11/1978 | Pryor | 356/374 |
| 4,170,828 | 10/1979 | Ernst | 33/125 C |
| 4,170,829 | 10/1979 | Nelle | 33/125 C |
| 4,231,662 | 11/1980 | Feinland | 356/373 |
| 4,262,423 | 4/1981 | Affa | 33/125 A |
| 4,363,964 | 12/1982 | Schmitt | 250/237 G |
| 4,385,836 | 5/1983 | Schmitt | 356/374 |
| 4,403,859 | 9/1983 | Ernst | 33/125 C |

FOREIGN PATENT DOCUMENTS

| | | | |
|---|---|---|---|
| 69936 | 10/1968 | Fed. Rep. of Germany | .... 33/125 C |
| 2518745 | 8/1977 | Fed. Rep. of Germany | .... 33/125 C |
| 7814349 | 5/1978 | Fed. Rep. of Germany | .... 33/125 C |
| 2735154 | 10/1978 | Fed. Rep. of Germany | .... 33/125 C |
| 2724858 | 11/1979 | Fed. Rep. of Germany | .... 33/125 C |
| 2820753 | 3/1980 | Fed. Rep. of Germany | .... 33/125 C |

OTHER PUBLICATIONS

Handbook of Transducers for Electronic Measuring Systems, by Harry N. Norton, California Institute of Technology, 1969 by Prentice Hall, pp. 192–197.

Primary Examiner—Willis Little
Attorney, Agent, or Firm—Willian Brinks Olds Hofer Gilson & Lione Ltd.

[57] ABSTRACT

In a measuring apparatus of the type having a measuring graduation which is scanned by a scanning unit that includes a scanning plate, the scanning plate is provided with at least two phase shifted scanning fields which are phase shifted with respect to one another in order to generate two analog scanning signals which are likewise phase shifted with respect to one another. In order to allow setting of the desired phase difference between the scanning signals, at least one of the scanning fields is made up of two partial scanning fields which are offset with respect to one another and are partially coverable by means of screws or diaphragms. The corresponding analog signal is made up of two partial analog signals obtained by use of the two partial scanning fields.

4 Claims, 11 Drawing Figures

LENGTH OR ANGLE MEASURING INSTRUMENT

BACKGROUND OF THE INVENTION

The present invention relates to a length or angle measuring instrument of the type which includes a scale and a scanning unit adapted to scan the scale, wherein the scanning unit comprises a scanning plate which comprises at least first and second scanning fields, phase shifted with respect to one another for generating respective first and second scanning signals which are likewise phase shifted with respect to one another, and means for directing light at the scanning plate.

In one known length measuring system a scanning unit is provided which operates to generate two analog scanning signals which are offset in phase angle with respect to one another. In this known device, the desired phase difference between the two analog signals is set by applying one of the two analog signals to a first input of an amplifier mixing stage and applying a regulating voltage to the second input of this amplifier mixing stage, which second input is derived from the other analog signal and is adjustable by means of electrical setting members. This arrangement requires a number of electrical components, and is both relatively expensive and susceptible to errors due to failure of the respective electrical components. Moreover, the phase angle adjustment is lost when the evaluating arrangement which contains the relevant electrical components is changed.

It is also a known practice in photoelectric position measuring systems to regulate the amplitude of analog scanning signals by using screws to control the flux of light which passes through the scanning fields of the scanning unit.

SUMMARY OF THE INVENTION

The present invention is directed to an improved position measuring device which allows a simple and reliable adjustment of the desired phase angle difference between two analog scanning signals and which operates in a particularly simple manner, entirely independently of the evaluating arrangement.

According to this invention, at least one of the scanning fields of the scanning unit is provided with first and second partial scanning fields, each of which is oriented at a respective phase angle such that the first and second partial scanning fields are phase shifted with respect to one another. Means are provided for selectively covering portions of at least one of the first and second partial scanning fields to an adjustable extent, and means are provided for generating the first scanning signal as a function of the light modulated by both the first and second scanning fields, such that the phase angle of the first scanning signal is adjustable in accordance with the extent to which the at least one of the partial scanning fields is covered by the covering means.

The present invention provides the important advantage that it allows reliable setting in or adjustment of the phase angle of the scanning signals in a manner which is relatively trouble free and which is preserved even in the event the electronic evaluating arrangement must be modified or exchanged. Further advantageous features of the invention are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 1b is a cross-sectional view of the apparatus of FIG. 1a taken in a plane perpendicular to the plane of FIG. 1a.

DETAILED DESCRIPTION OF THE PRESENTLY PREFERRED EMBODIMENTS

Figure 1A:
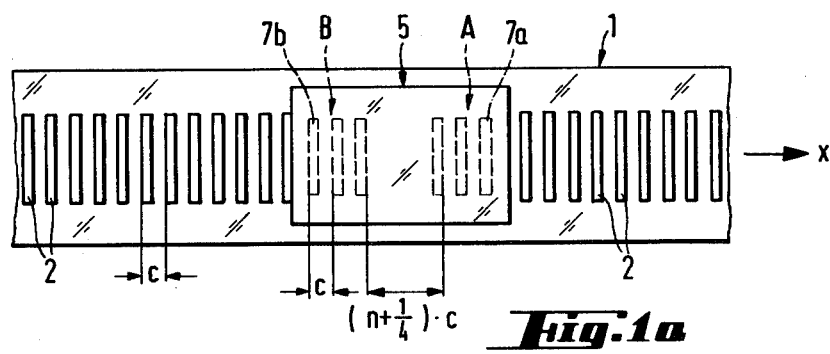
FIG. 1a is a schematic representation of a scanning plate and measuring scale of a length measuring device.
Figure 1B:
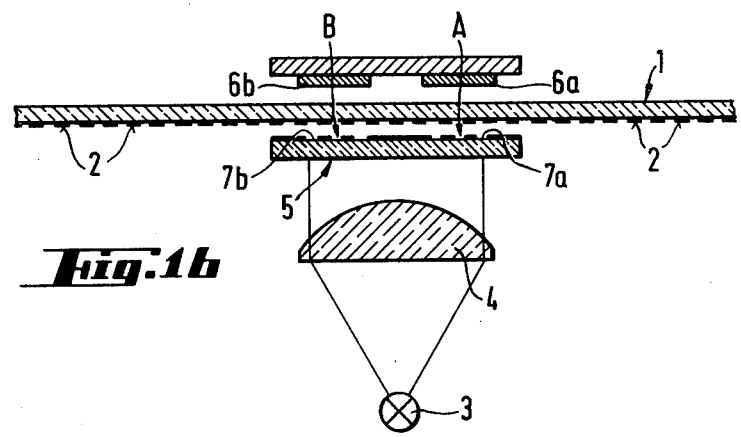

Turning now to the drawings, FIGS. 1a and 1b schematically show a known prior art length measuring device which includes a measuring scale 1 which defines an incremental graduation 2. This graduation 2 is scanned by means of a scanning unit that includes a lamp 3, a condenser lens 4, a scanning plate 5, and photosensitive elements 6a, 6b. The scanning plate 5 defines two scanning fields A, B, each of which defines a respective incremental graduations 7a, 7b. The graduation 7a, 7b as well as the graduation 2 of the scale 1 are made up of alternating transparent and non-transprent strips, and in all cases the grid constant is equal to the value C as shown in FIG. 1a. The graduation 7a is phase shifted with respect to the graduation 7b by an amount equal to $(N+\frac{1}{4})$ C in the measuring direction X. Light emitted by the lamp 3 passes through the condenser lens 4, the graduations 7a, 7b of the scanning fields A, B of the scanning plate 5, the graduation 2 of the scale 1, and inpinges upon the photosensitive elements 6a, 6b. Each of the photosensitive elements 6a, 6b is situated to be illuminated by light which has passed through a respective one of the two scanning fields A, B.

Relative movement between the scanning unit and the scale 1 in the measuring direction X causes the intensity of light passing through the graduations 2, 7a, 7b to be modulated so that the two photosenstive elements 6a, 6b generate two periodic analog scanning signals $S_A$, $S_B$. In view of the fact that the two graduations 7a, 7b are phase shifted by a phase angle equal to C/4, the two analog signals $S_A$, $S_B$ are displaced with respect to one another by a phase angle $\phi$ equal to 90°. This is done in order to make possible a direction discrimination with regard to measuring movement in the X direction as well as a subdivision of the grid period by means of suitable interpolation techniques. The graduation 2 of the scale 1 and the graduations 7a, 7b of the scanning plate 5 are arranged at a slight distance or separation from one another which by reason of mechanical imperfections is subject to certain fluctuations. In order to minimize changes in the phase angle $\phi$ equal to 90° between the two analog signals $S_A$, $S_B$, the lamp 3 is adjusted with respect to the condenser lens 4 in such a manner that light emerging from the condenser lens 4 is as parallel as possible. As a result of unavoidable manufacturing tolerances, a phase angle error can nevertheless arise between the analog signals $S_A$, $S_B$. In many cases, such a phase angle error is only perceived when the measuring apparatus is set in operation.

According to this invention, an arrangement is provided for setting in or adjusting the phase angle $\phi$ as necessary to allow an exact subdivision of the grid period or interpolation without changing the parallelism of the light. As shown in the preferred embodiment of FIG. 2 a scanning plate 5' is provided in this embodiment which defines a scanning field B and a scanning field A. The scanning field A is made up of two partial scanning fields $A_1$, $A_2$. With respect to the scanning field B, the partial scanning field $A_1$ is offset by a phase angle $(\phi+\alpha)$ and the partial scanning field $A_2$ is offset by a phase angle $(\phi-\alpha)$. A first photosensitive element $P_B$ as aligned with the scanning field B, and a common photosensitive element $P_A$ is aligned to receive light modulated by both of the partial scanning fields $A_1$, $A_2$. The two photosensitive elements $P_A$, $P_B$ generate the two analog scanning signals $S_A$, $S_B$, respectively. The analog scanning signal $S_A$ is made up of two analog partial signals $S_{A1}$, $S_{A2}$, which are obtained with the aid of the partial scanning fields $A_1$, $A_2$. As shown in FIGS. 3a to 3c, the analog partial signal $S_{A1}$ is offset with respect to the analog signal $S_B$ by a phase angle $(\phi+\alpha)$ and the analog partial signal $S_{A2}$ is offset with respect to the analog signal $S_B$ by a phase angle $(\phi-\alpha)$ (FIG. 3a).

Figure 2:
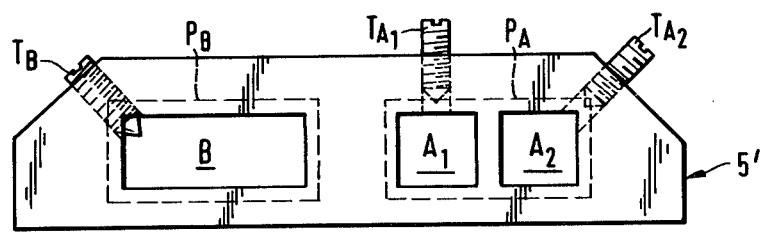
FIG. 2 is a plan view of a scanning plate which incorporates a first preferred embodiment of this invention.
Figure 3A:
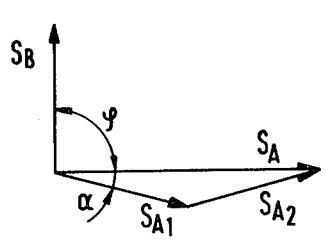
FIGS. 3a, 3b, and 3c are vector diagrams of the analog signals generated by means of the scanning plate of FIG. 2.
Figure 3B:
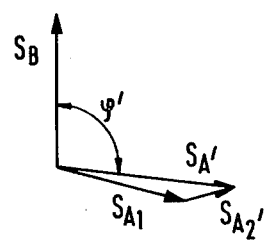
Figure 3C:
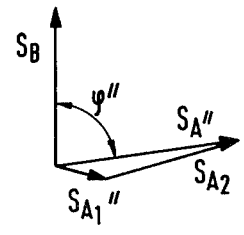

As shown in FIG. 2, the scanning plate 5' is provided with two screws $T_{A1}$, $T_{A2}$ associated with the partial scanning fields $A_1$, $A_2$ for the setting in of the desired phase angle $\phi$. The screws $T_{A1}$, $T_{A2}$, are arranged in threaded bores in the scanning plate 5' and extend into the region of the scanning fields $A_1$, $A_2$ by an adjustable amount. In this way, the screws $T_{A1}$, $T_{A2}$ regulate the light flux passing through the partial scanning fields $A_1$, $A_2$, respectively. As shown in FIG. 3b, by reducing the amplitude of the analog partial signal $S_{A2}$ there is obtained a partial signal $S_{A2}'$ which together with the partial signal $S_{A1}$ yields an analog signal $S_A'$ which is offset with respect to the analog signal $S_B$ by a phase angle of $\phi'$ greater than $\phi$. As shown in FIG. 3c, by reducing the amplitude of the analog partial signal $S_{A1}$ there is obtained a partial signal $S_{A1}''$ which together with the partial signal $S_{A2}$ yields an analog signal $S_A''$ which is offset with respect to the analog signal $S_B$ by a phase angle $\phi''$ less than $\phi$. The scanning plate 5' also includes a screw $T_B$ for the scanning field B which can be used to regulate the amplitude of the analog signal $S_B$. From this discussion it should be apparent that by adjusting the screws $T_{A1}$ and $T_{A2}$ as necessary, the phase angle $\phi$ between the two scanning signals $S_A$, $S_B$ can be increased or decreased as necessary to obtain the desired phase angle.

In many embodiments it is advantageous that only one photosensitive element $P_A$ be used for both of the partial scanning fields $A_1$, $A_2$. However, in a manner which is not shown in the drawings separate photosensitive elements can be allocated to each of the partial scanning fields $A_1$, $A_2$, and the analog signals of these two separate photosensors can be combined electronically. In this case, the two analog scanning signals derived from the partial scanning field $A_1$, $A_2$ take the following form:

$$S_{A1}=S_{A10}+S_{A11}\sin(\omega t+\alpha),$$

and $$S_{A2}=S_{A20}+S_{A21}\sin(\omega t-\alpha).$$

When $S_{A1}$ is added to $S_{A2}$ to generate the resulting analog signal $S_A$ in the simplest case the following result is obtained:

$$S_{A10}=S_{A20}=S_{A0}/2,$$

and $$S_{A11}=S_{A21}=S_{A11}/2$$

In this case $S_A$ takes the following form:

$$S_A=S_{A0}+S_{A1}/2\cdot(\sin\omega t\cdot\cos\alpha+\cos\omega t\cdot\sin\alpha+\sin\omega t\cdot\cos\alpha-\cos\omega t\cdot\sin\alpha).$$

In alternate form, $S_A=S_{A0}+S_{A1}\cdot(\sin\omega t\cdot\cos\alpha)$.

The contrast K of the resulting analog signal $S_A$ is defined as follows:

$$K = \text{modulation/constant light component}$$
$$= S_{A1}\cos\alpha/S_{A0}.$$

Thus, the constrast K decreases with $\cos\alpha$. For practical cases $\alpha=15°$ suffices so that the contrast K diminishes at most only by an amount equal to $(1-\cos 15°)=3.4\%$.

Figure 4:
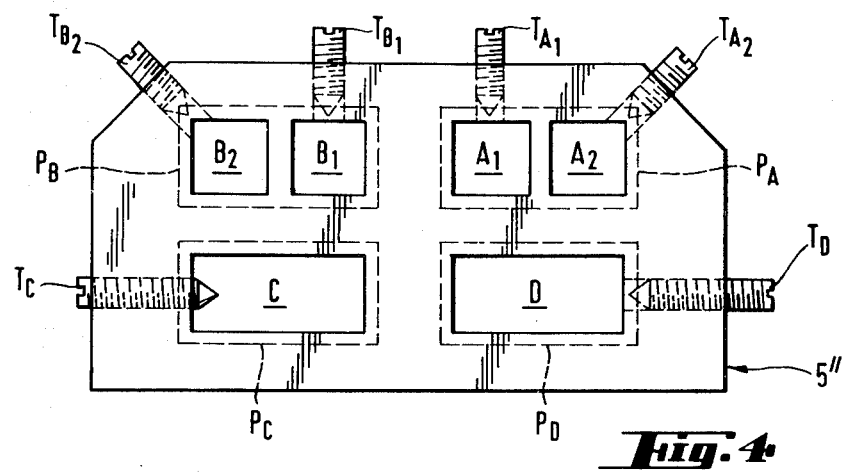
FIG. 4 is a plan view of a scanning plate which incorporates a second preferred embodiment of this invention.
Figure 5:
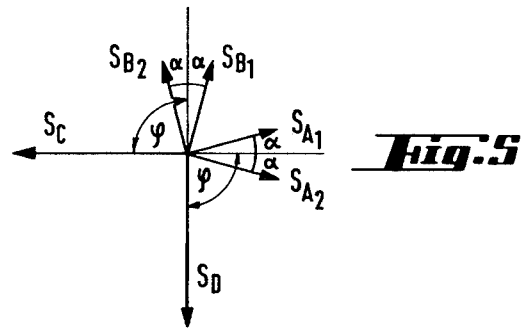
FIG. 5 is a vector diagram of analog signals generated by means of the scanning plate of FIG. 4.

Turning now to FIG. 4, scanning plate 5" incorporates a second preferred embodiment of this invention. The scanning plate 5" defines four scanning fields A, B, C, D, which are offset in each case by a phase angle $\phi=90°$. The scanning field A is made up of two partial scanning fields $A_1$, $A_2$, and the scanning field B is made up of two partial scanning fields $B_1$, $B_2$. With respect to the scanning field D, the partial scanning field $A_1$ is offset by the phase angle $(\phi+\alpha)$ and the partial scanning field $A_2$ is offset by the phase angle $(\phi-\alpha)$. With respect to the scanning field C the partial scanning field $B_1$ is offset by the phase angle $(\phi+\alpha)$ and the partial scanning field $B_2$ by the phase angle $(\phi-\alpha)$. A first common photosensitive element $P_A$ is allocated to the two partial scanning fields $A_1$, $A_2$ and a second common photosensitive element $P_B$ is allocated to the two partial scanning fields $B_1$, $B_2$. Two additional photosensitive elements $P_C$ and $P_D$ are allocated to the scanning fields C, D, respectively. The four photosensitive elements $P_A$, $P_B$, $P_C$, $P_D$ generate four periodic analog scanning signals $S_A$, $S_B$, $S_C$, $S_D$, respectively. The analog signal $S_A$ is made up of the sum of the two analog partial scanning signals $S_{A1}$, $S_{A2}$ (in a matter similar to that described above in conjunction with the first preferred embodiment). Similarly, the analog scanning signal $S_B$ is made up of the analog partial scanning signals $S_{B1}$, $S_{B2}$. With respect to the analog scanning signal $S_D$, the analog partial scanning signal $S_{A1}$ is offset by the phase angle $(\phi+\alpha)$ and the analog partial scanning signal $S_{A2}$ is offset by the phase angle $(\phi-\alpha)$. With respect to the analog scanning signal $S_C$, the analog partial scanning signal $S_{B1}$ is offset by the phase angle $(\phi+\alpha)$ and the analog partial scanning signal $S_{B2}$ is offset by the phase angle ($\phi-\alpha$). FIG. 5 shows the phase relationships among the various scanning signals and partial scanning signals.

Figure 6:
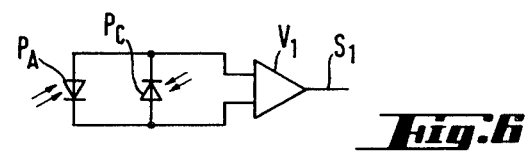
FIG. 6 is a schematic diagram of a photosensitive circuit suitable for use with the scanning plate of FIG. 4.
Figure 7:
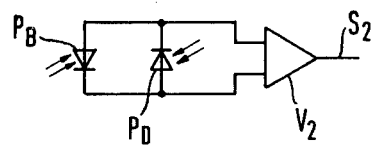
FIG. 7 is a graphic representation of an analog scanning signal.
Figure 7:
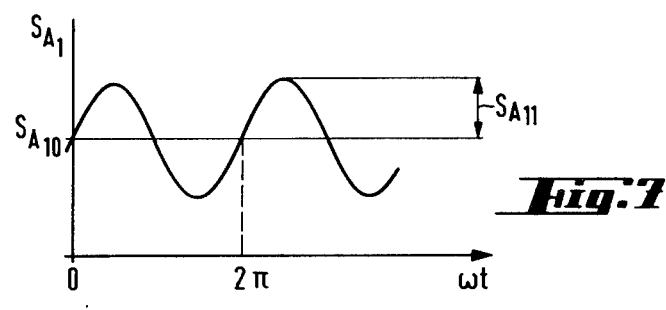

As shown in FIG. 4, the scanning plate 5" includes four screws $T_{A1}$, $T_{A2}$, $T_{B1}$, $T_{B2}$, for regulating the amplitude of light passing through the partial scanning fields $A_1$, $A_2$, $B_1$, $B_2$, respectively. These screws are used for setting in the desired phase angle $\phi$ in a manner identical to that described above in conjunction with the first preferred embodiment. Similarly, by means of the screws $T_C$, $T_D$ the amplitudes of the analog scanning signals $S_C$, $S_D$ can also be regulated. In this second preferred embodiment, the analog signals $S_A$, $S_C$ are phase displaced from one another by 180°, as are the analog scanning signals $S_B$, $S_D$. In order to eliminate the direct voltage constituents of the analog signals $S_A$, $S_C$ and $S_B$, $S_D$, the photosensitive $P_A$, $P_C$ are connected to a first amplifier $V_1$ and the photosensitive elements $P_B$, $P_D$ are connected to a second amplifier $V_2$ in difference, as shown in FIG. 6. The amplifiers $V_1$, $V_2$ generate analog signals $S_1$, $S_2$ as outputs. The zero symmetry and the relative phase angle between these two signals $S_1$, $S_2$ can be adjusted by turning the screws $T_{A1}$, $T_{A2}$, $T_{B1}$, $T_{B2}$, $T_C$, $T_D$ so as to adjust the signals $S_1$, $S_2$ so that they are suitable for any particular subdivision factor of the signal period.

Figure 8:
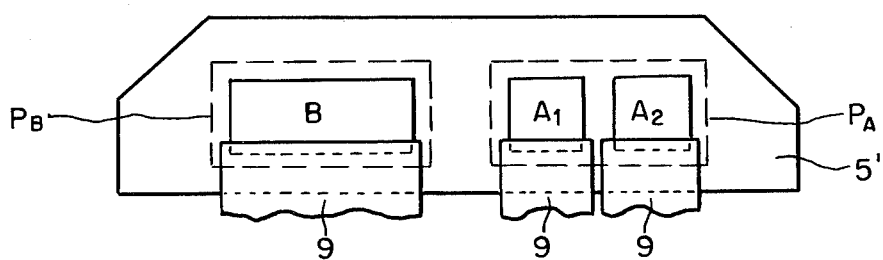
FIG. 8 is a plan view of a scanning plate similar to that of FIG. 2 which incorporates diaphragms rather than screws for adjusting the intensity of light passing through the respective scanning fields.

The partial scanning signals $S_{A1}$, $S_{A2}$ in alternate embodiments may be offset with respect to the analog scanning signal $S_B$ by phase angles ($\phi+\alpha_1$) and ($\phi-\alpha_2$), respectively. Furthermore, in other alternative embodiments the partial scanning fields and the scanning fields can be partially covered by means of diaphragms 9 rather than screws, as shown in FIG. 8.

Of course, it should be understood that a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a length or angle measuring apparatus comprising a measuring scale and a scanning unit adapted to scan the scale; wherein the scanning unit comprises a scanning plate which comprises at least first and second scanning fields, phase shifted with respect to one another for generating respective first and second scanning signals which are phase shifted with respect to one another; and means for directing light at the scanning plate; the improvement comprising:
   first and second partial scanning fields included in said scanning field, said first and second partial scanning fields each oriented at a respective phase angle such that the first and second partial scanning fields are phase shifted with respect to one another;
   means for covering a selectable portion of at least one of the first and second partial scanning fields to an adjustable extent; and
   means for generating the first scanning signal as a function of light modulated by both the first and second scanning fields, such that the phase angle of the first scanning signal is adjustable in accordance with the extent to which the at least one of the partial scanning fields is covered by the covering means.

2. The invention of claim 1 wherein the covering means comprises at least one screw mounted to the scanning plate to partially cover the at least one of the scanning fields.

3. The invention of claim 1 wherein the covering means comprises at least one diaphragm mounted to the scanning plate to partially cover the at least one of the scanning fields.

4. The invention of claim 1 wherein the generating means comprises a single photosensor positioned to respond to light modulated by both the first and second partial scanning fields.

* * * * *